UNITED STATES PATENT OFFICE.

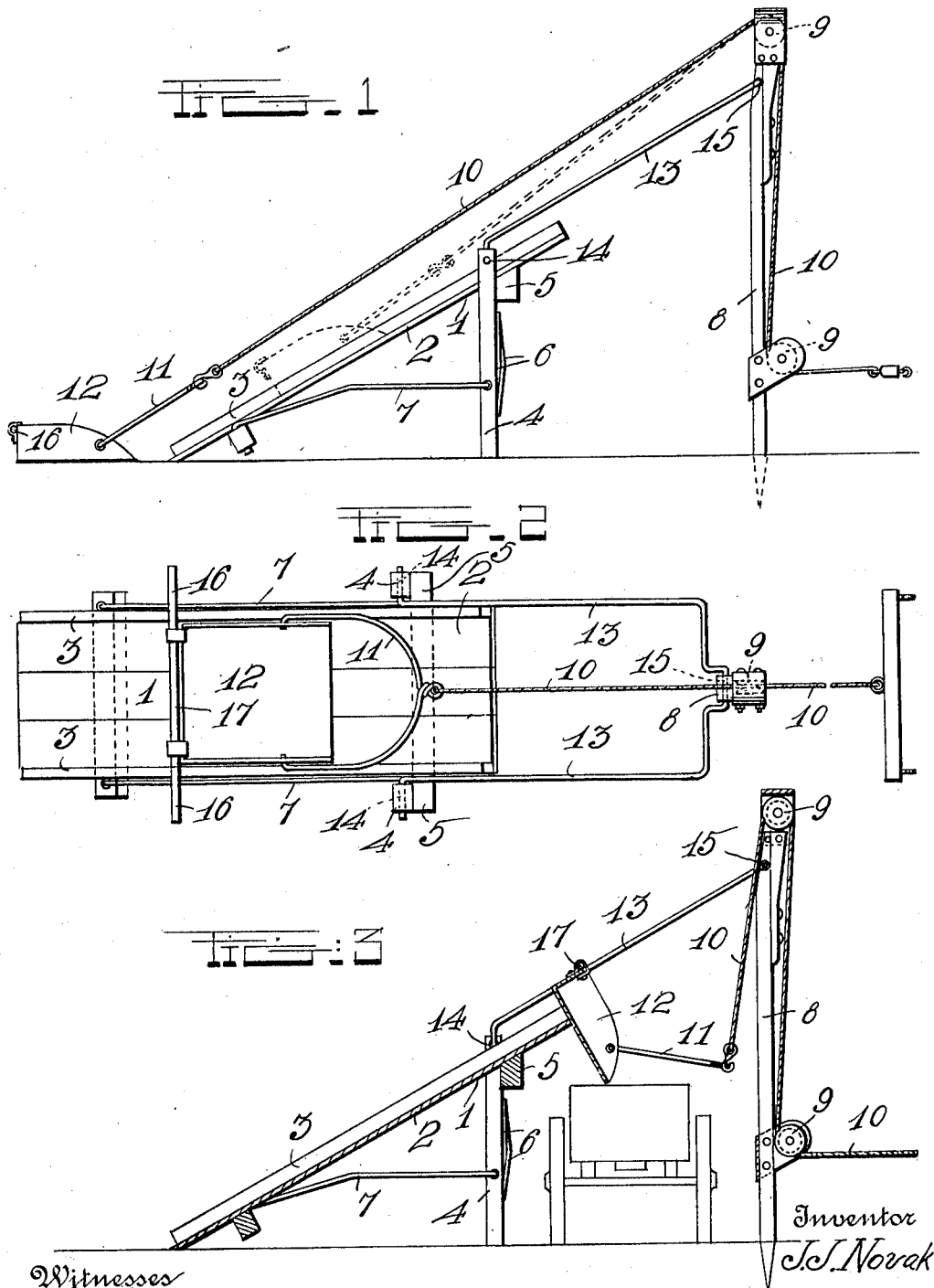

JULIUS J. NOVAK, OF LOMA, NEBRASKA.

MANURE-LOADER AND LIKE DEVICE.

970,259.  Specification of Letters Patent.  Patented Sept. 13, 1910.

Application filed May 12, 1910. Serial No. 560,925.

*To all whom it may concern:*

Be it known that I, JULIUS J. NOVAK, a citizen of the United States, residing at Loma, in the county of Butler and State of Nebraska, have invented certain new and useful Improvements in Manure - Loaders and Like Devices; and I do declare the following to be a full, clear, and exact description of the invention, such as will enable others skilled in the art to which it appertains to make and use the same.

This invention relates to new and useful improvements in manure loaders and like devices of the type in which a scoop is employed to remove the manure, dirt or other rubbish, and suitable means are provided for raising the scoop to automatically dump its contents into a wagon or bin. I accomplish this result by means of a novel and simplified mechanism hereinafter fully described, illustrated in the accompanying drawings and particularly pointed out in the subjoined claims.

In the accompanying drawings: Figure 1 is a side elevation of an excavating device embodying my improvements. Fig. 2 is a plan view thereof. Fig. 3 is a fragmentary view showing the scoop in dumping position.

Referring to the drawings for a more particular description of the invention, the device comprises a frame 1, having an upwardly inclined platform 2, the sides of which are provided with the guard strips or flanges 3. The upper end of the platform is supported by the upright supports 4 and cross bar 5. The uprights 4 are suitably braced by the diagonal brace bars 6, while longitudinal brace bars 7 are arranged between the uprights and the lower end of the platform to add to the strength and durability of the frame.

A pulley-supporting post or stake 8 is suitably secured a short distance from the platform 2, and supports the upper and lower pulleys 9 over which passes the cable 10 or other flexible traction element, one end of which is suitably connected to a swingle or double tree to which the draft animal or animals are attached. The opposite end of this cable is adapted to be connected by the pivoted frame 11 to the scoop or scraper 12, which may be of any desired form and provided with a solid or toothed bottom, as exigencies require. Suitably mounted upon the rear wall of the scoop or scraper 12, as by the ears 18, is a cross bar 17, the ends 16 of which project on each side beyond the side wall of the scoop.

A U-shaped frame 13 is suitably supported between the platform 2 and the stake 8, being herein shown as having its ends pivoted in the upper ends of the uprights 4 and its central portion mounted in the upper end of the stake 8.

In practice the scraper is first drawn across the pit or heap of manure, rubbish, or the like when the draft animals are started the scraper being dragged to the lower end of the platform, and then up the incline 2. After reaching the upper end of the platform the ends 16 of the cross bar 17 contact with the side pieces of the frame 13, and the scraper swings beyond the upper end of the platform, the ends of the cross bar acting as pivots upon which the scraper may revolve. By this means, the scraper or scoop 12 will be automatically dumped, and its contents discharged into a wagon, bin, or other suitable receptacle arranged below the upper end of the inclined platform.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having described my invention, what I claim as new and desire to secure by Letters-Patent is:

1. An excavating device comprising a frame having an upwardly inclined platform, a pulley supporting post, a scoop, a cable passing over the pulleys and connected with the scoop as a means for drawing the scraper up the platform, a substantially U-shaped frame pivotally mounted between the post and upper end of the platform of the frame to support the scraper in dumping position, and a cross bar detachably mounted to extend transversely across the rear portion of the scraper and project on each side therefrom, the projecting ends of said cross bar being adapted to contact with said U-shaped frame to dump the scraper.

2. An excavating device of the class described comprising a supporting frame having an inclined platform, a pulley supporting stake, a U-shaped frame between the supporting frame and the stake, a scraper, a cable passing over the pulleys and connected with the scraper as a means for pulling it up the platform and a cross bar attached to the scraper adjacent the rear extremity of the scraper, and having its opposite ends projecting on the opposite sides of said scraper and adapted to rotate on the side pieces of the U-shaped frame whereby the scraper is permitted to swing down into dumping position after reaching the U shaped frame.

3. A device of the character described comprising a supporting frame having an inclined platform, a pulley supporting stake, a plurality of pulleys suitably arranged thereon, a U-shaped frame pivotally mounted between the supporting frame and the stake, a scraper having a bail pivotally mounted adjacent its forward extremity, a cable passing over the pulleys upon the stake and connected with the scraper, a plurality of apertured ears extending upwardly from the rear extremity of the scraper, and a cross bar mounted in said apertured ears, and adapted to extend transversely beyond each side of the scraper, said projecting ends of the cross bar being adapted to contact with the sides of the U-shaped frame when the scraper is in dumping position.

In testimony whereof I have hereunto set my hand in presence of two subscribing witnesses.

JULIUS J. NOVAK.

Witnesses:
A. K. SMITH,
A. O. KLEIN.